Patented July 22, 1941

2,250,332

UNITED STATES PATENT OFFICE 2,250,332

PREPARATION OF ISOCYTOSINE

Erwin Kuh, New Brunswick, N. J., assignor to American Cyanamid Company, New York, N. Y., a corporation of Maine No Drawing. Application February 20, 1941, Serial No. 379,829

6 Claims. (Cl. 260—251)

This invention relates to an improved method of producing isocytosine, and more particularly to improvements in the separation of isocytosine from reaction mixtures containing the same.

In the patent to Roblin and English, No. 2,224,836, there is described and claimed a process of producing isocytosine sulfate by the reaction of a guanidine salt with formylacetic acid in sulfuric acid solution or preferably with a reaction mixture of fuming sulfuric acid and malic acid containing formylacetic acid. The process requires dilution of the reaction mixture with water by drowning in ice, and large quantities of aqueous sulfuric acid resulting from this treatment had to be neutralized with caustic soda, ammonia, or the like, and the isocytosine crystallized out. This crystallization was very slow and it was not complete, the losses of isocytosine in the large volume of mother liquor amounting to 20% of the yield. Further losses also resulted from decomposition of the isocytosine by hydrolysis in the strongly acid aqueous solutions.

The present invention is based on the discovery that although isocytosine sulfate is very soluble in water, it is almost insoluble in a mixture of sulfuric acid and methanol, and the amount of methanol required is surprisingly small, practically quantitative precipitation being effected with about 5 parts of methanol to 6 parts of sulfuric acid. The volume of liquid is only about one-tenth that produced by drowning in ice and there are no large losses in the mother liquor and no danger of decomposition in the acid methanol solution because of the absence of water.

While the process of the present invention is not critically dependent on maintenance of any particular temperature, it is desirable and hence preferred to maintain the mixture between 0° and 15° C. while the methanol and acid are being mixed, and preferably the acid is poured into the methanol rather than the reverse. The cooling may be effected by external cooling, for example, by use of a freezing mixture or by the addition of solid carbon dioxide to the reaction mixture itself. The acid sulfate of isocytosine precipitates in the form of a light brown crystalline product which can be readily filtered, washed with methanol and dried at low temperatures. It is a stable salt, soluble in water and difficultly soluble in methanol. The isocytosine acid sulfate is usable in the production of 2-amino-4-chloropyrimidine which is the most important use for isocytosine. However, if desired, free isocytosine can be prepared by neutralizing the acid sulfate with ammonia at 20–25° C. to a pH of about 8.

It is an advantage of the present invention that the methanol used can be recovered to a large extent by distilling the mother liquor from the precipitation of the isocytosine sulfate preferably after dilution with a suitable amount of water.

The present invention is not limited to the use of methanol but operates satisfactorily with ethanol and even with somewhat higher paraffin water-soluble alcohols. However, the higher alcohols because of their greater molecular weight are used in larger amounts. Therefore methanol is the preferred alcohol to use as it results in the cheapest process.

The invention will be described in greater detail in conjunction with the following specific example, but it is not intended that it be limited to the details therein set forth.

Example

The sulfuric acid solution of isocytosine resulting from the reaction of 225 parts of 20% oleum, 30 parts malic acid, and 23 parts of guanidine carbonate is added gradually to 200 parts of methanol at about 5° C. with strong cooling and agitation. Isocytosine acid sulfate precipitates and after stirring for ½ hour to secure complete crystallization, it is filtered off and washed with fresh methanol to remove adhering mother liquor. It may then be dried at a low temperature. The yield is 85% of theory based on the malic acid used. It has a light brown color.

If isocytosine base is desired it may be obtained by suspending the wet cake of isocytosine acid sulfate in ice and water and neutralizing with ammonia to a pH of 8 while holding the temperature below 30° C. The isocytosine which crystallizes may be filtered, washed and dried, giving a yield of 80% of theory or more.

What I claim is:

1. A method of recovering an isocytosine sulfate from reaction mixtures containing the isocytosine sulfate and sulfuric acid which comprises admixing the reaction mixture with a sufficient amount of a water-soluble lower paraffin alcohol to precipitate out the isocytosine acid sulfate.

2. A method of recovering an isocytosine sulfate from a reaction mixture produced by the reaction of a guanidine salt with the reaction mixture of fuming sulfuric acid and malic acid which comprises admixing the isocytosine containing reaction mixture with a sufficient amount of a water-soluble lower paraffin alcohol to precipitate out the isocytosine acid sulfate.

3. A method of recovering an isocytosine sulfate from reaction mixtures containing the isocytosine sulfate and sulfuric acid which comprises admixing the reaction mixture with a sufficient amount of methanol to precipitate out the isocytosine acid sulfate.

4. A method of recovering an isocytosine sulfate from a reaction mixture produced by the reaction of a guanidine salt with the reaction mixture of fuming sulfuric acid and malic acid which comprises admixing the isocytosine containing reaction mixture with a sufficient amount of methanol to precipitate out the isocytosine acid sulfate.

5. A method according to claim 1 in which the precipitated isocytosine acid sulfate is separated by filtration and is purified by washing with the alcohol.

6. A method according to claim 3 in which the precipitated isocytosine acid sulfate is filtered and purified by washing with methanol.

ERWIN KUH.